Jan. 6, 1942.　　W. F. GROENE ET AL　　2,269,368
HYDRAULIC FEEDING MECHANISM
Filed Jan. 31, 1940　　13 Sheets-Sheet 5
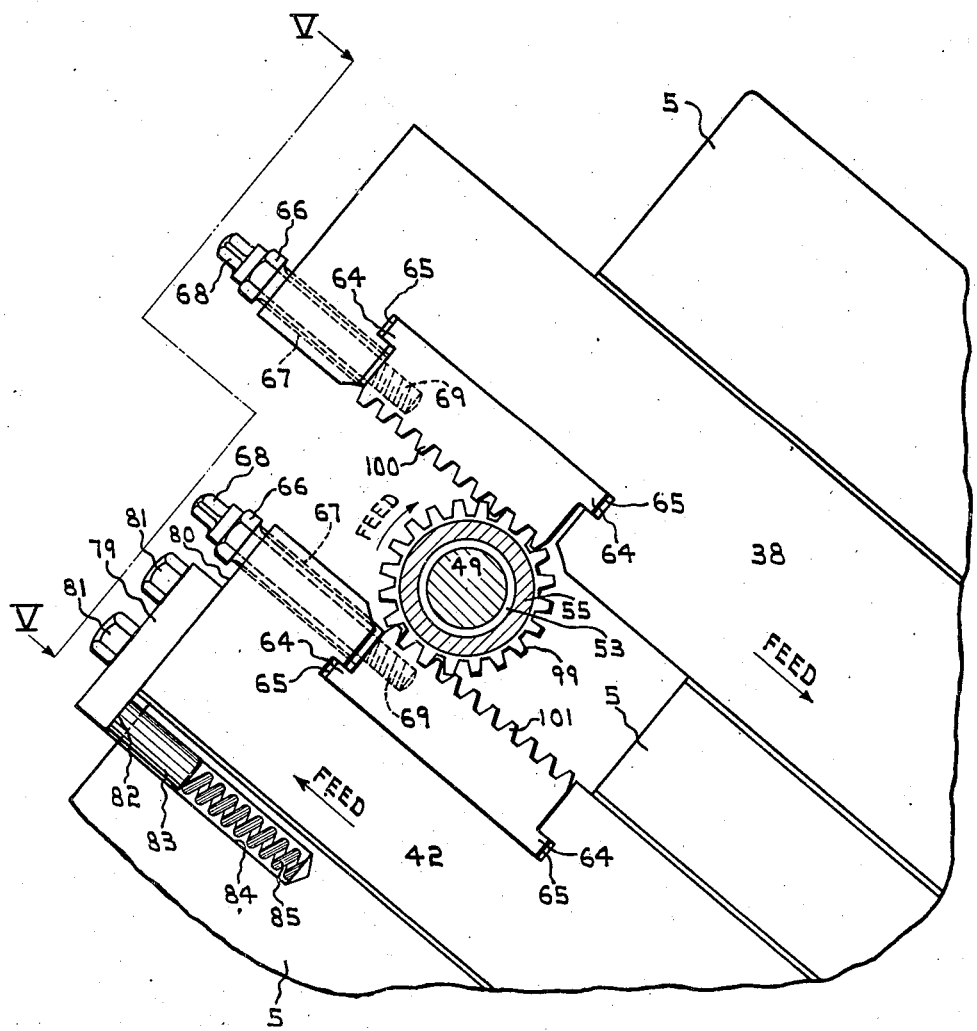
FIG. VI
INVENTOR.
WILLIAM F. GROENE
HAROLD J. SIEKMANN
BY Willard S. Groene
ATTORNEY.

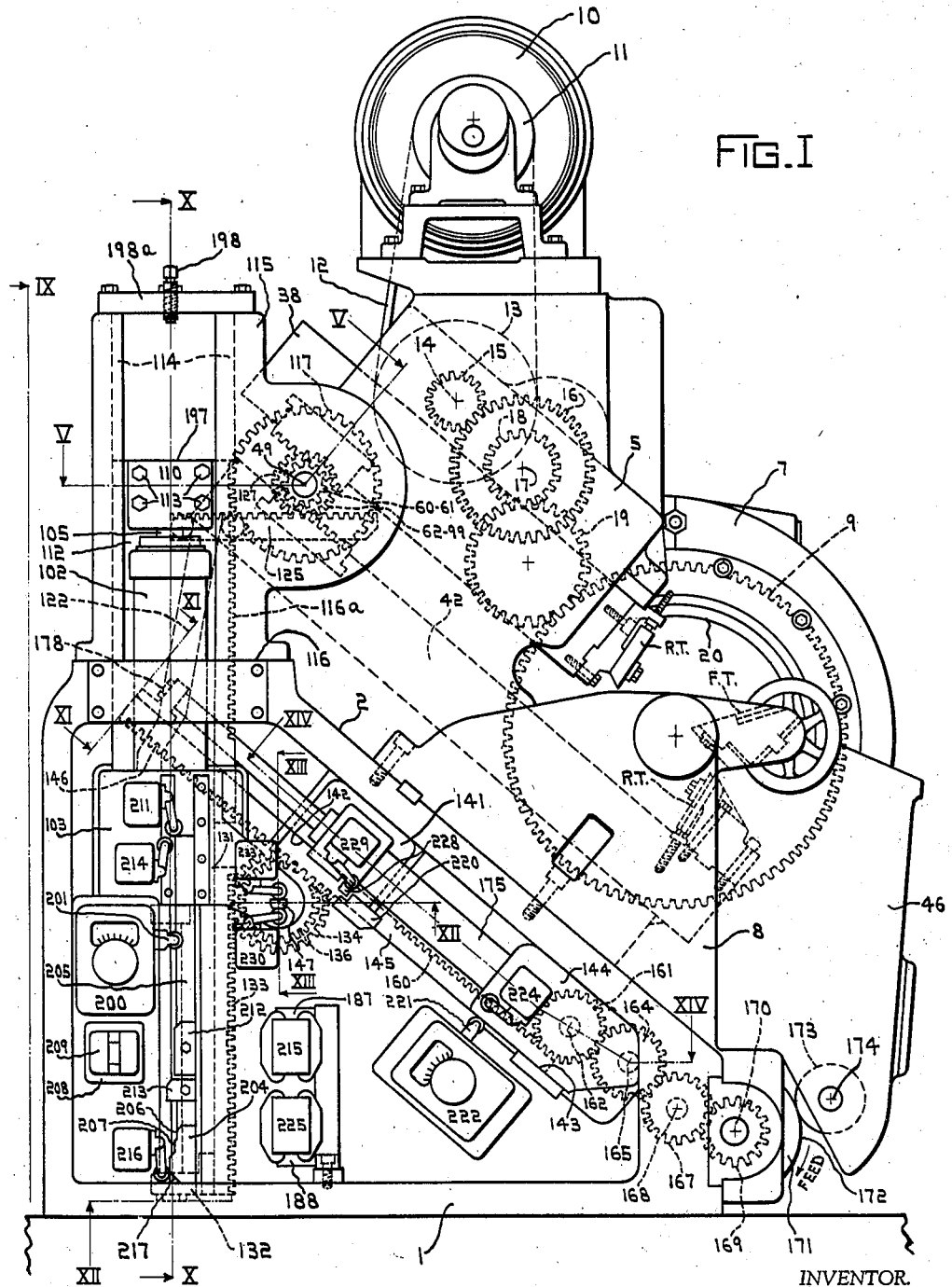
Jan. 6, 1942.  W. F. GROENE ET AL  2,269,368
HYDRAULIC FEEDING MECHANISM
Filed Jan. 31, 1940   13 Sheets-Sheet 1
FIG. I
INVENTOR.
WILLIAM F. GROENE
HAROLD J. SIEKMANN
BY Willard S. Groene
ATTORNEY.

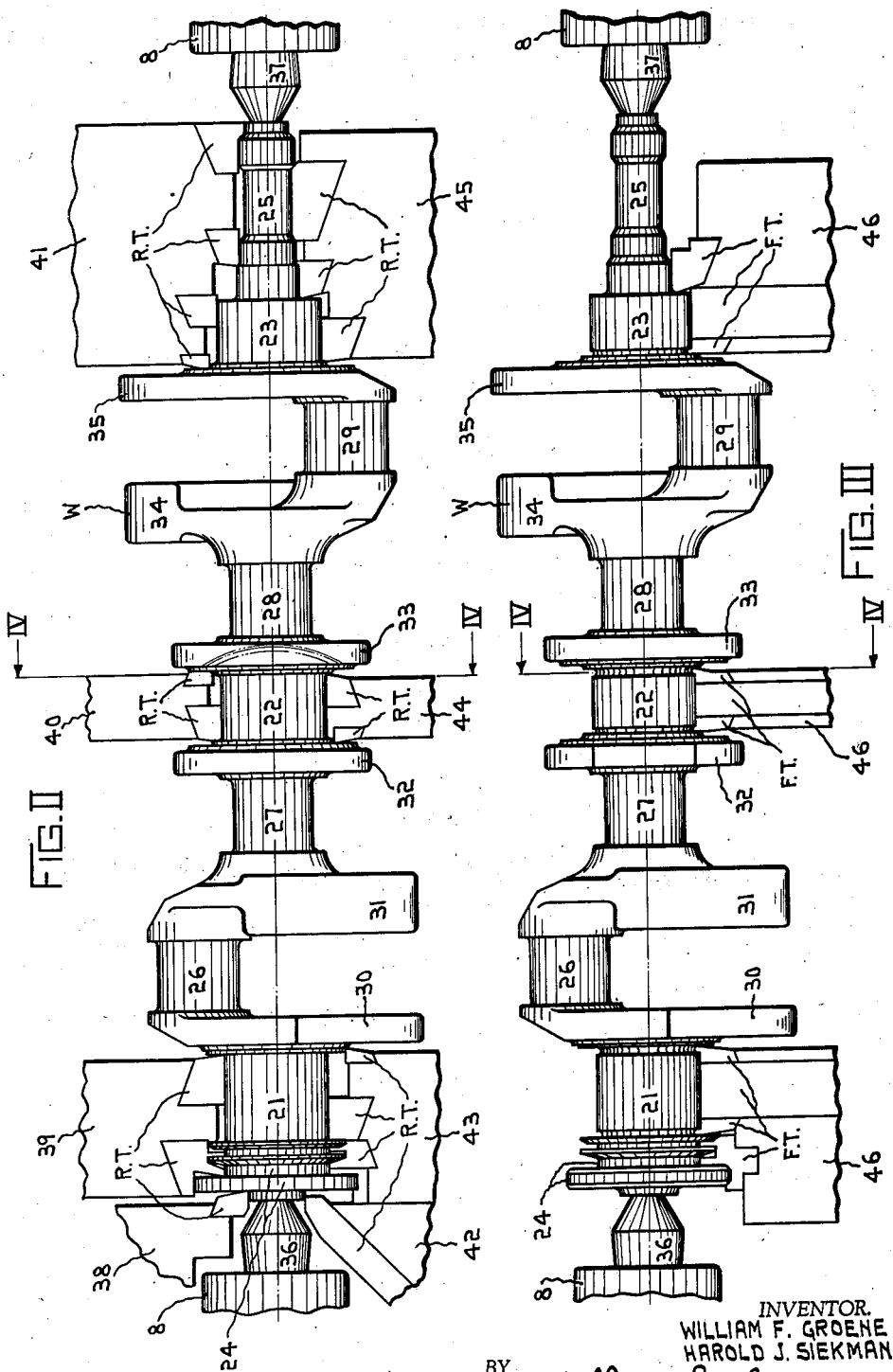

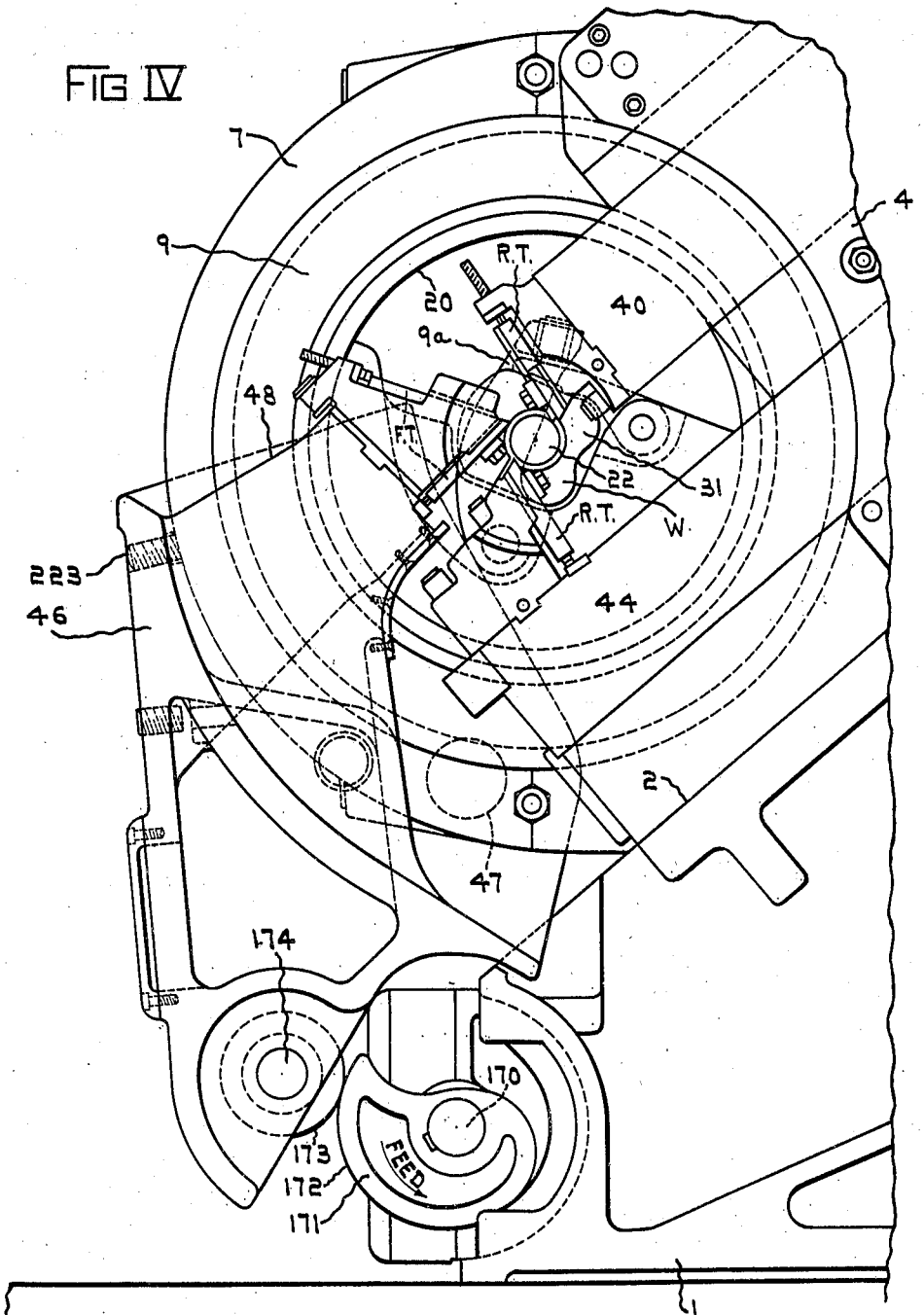

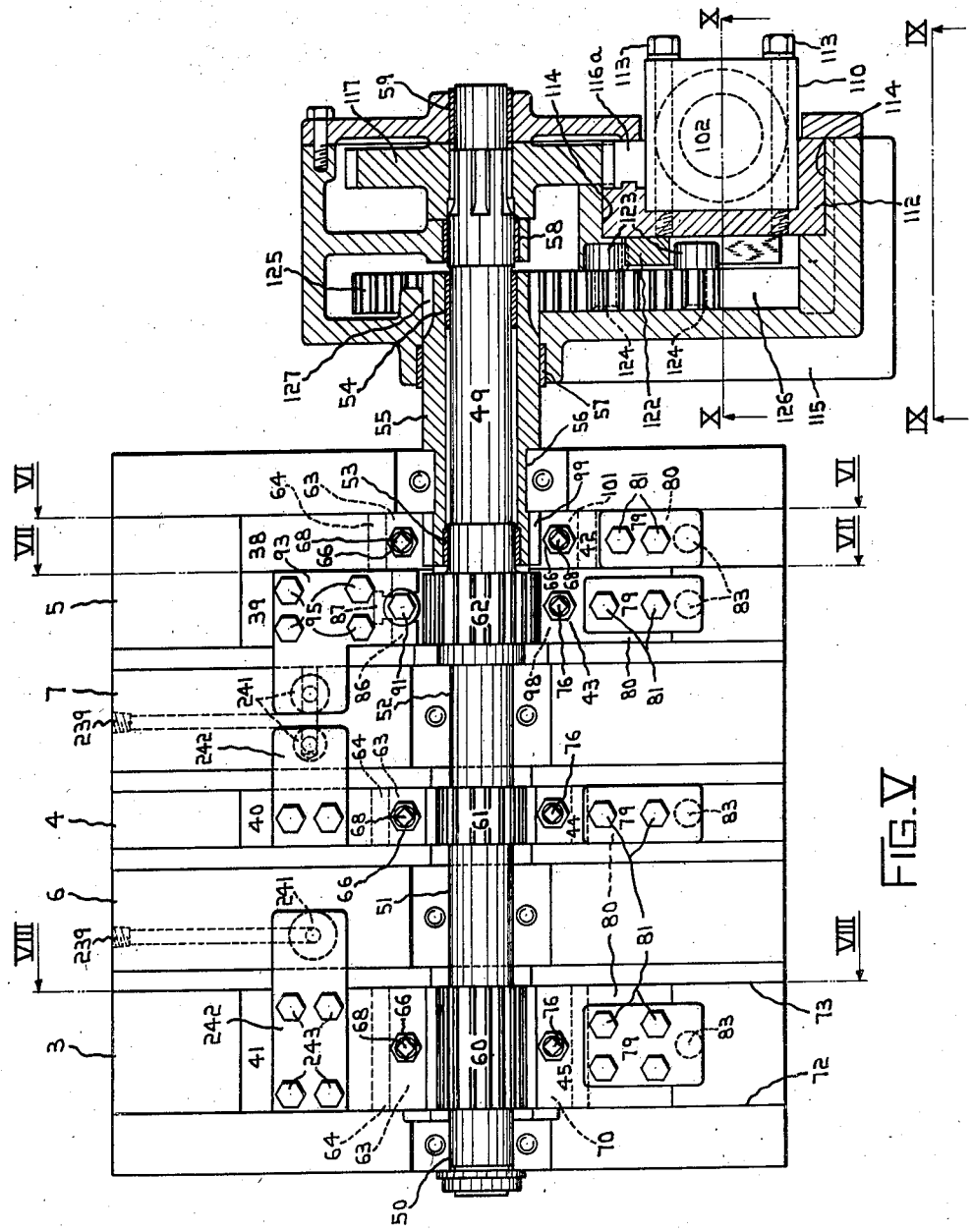

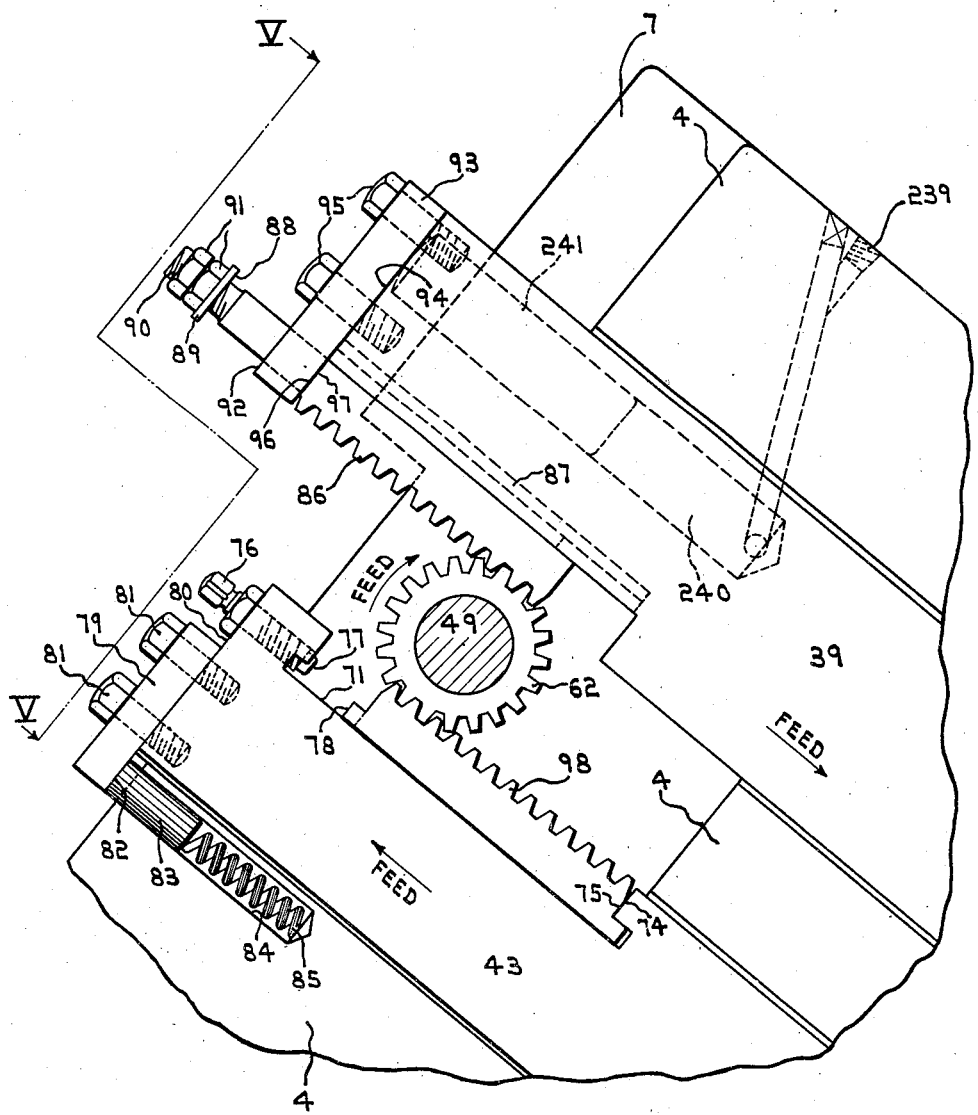
FIG. VII

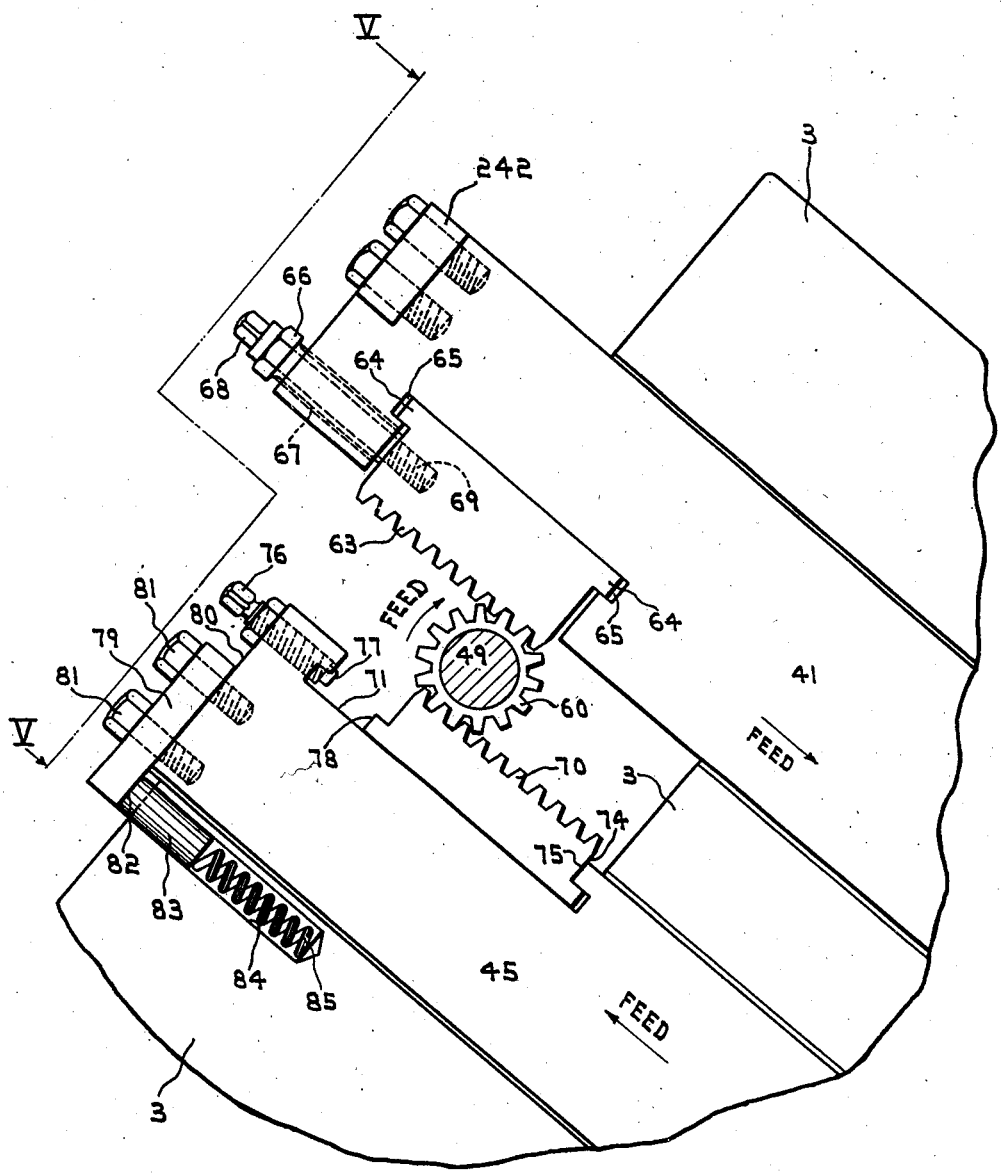

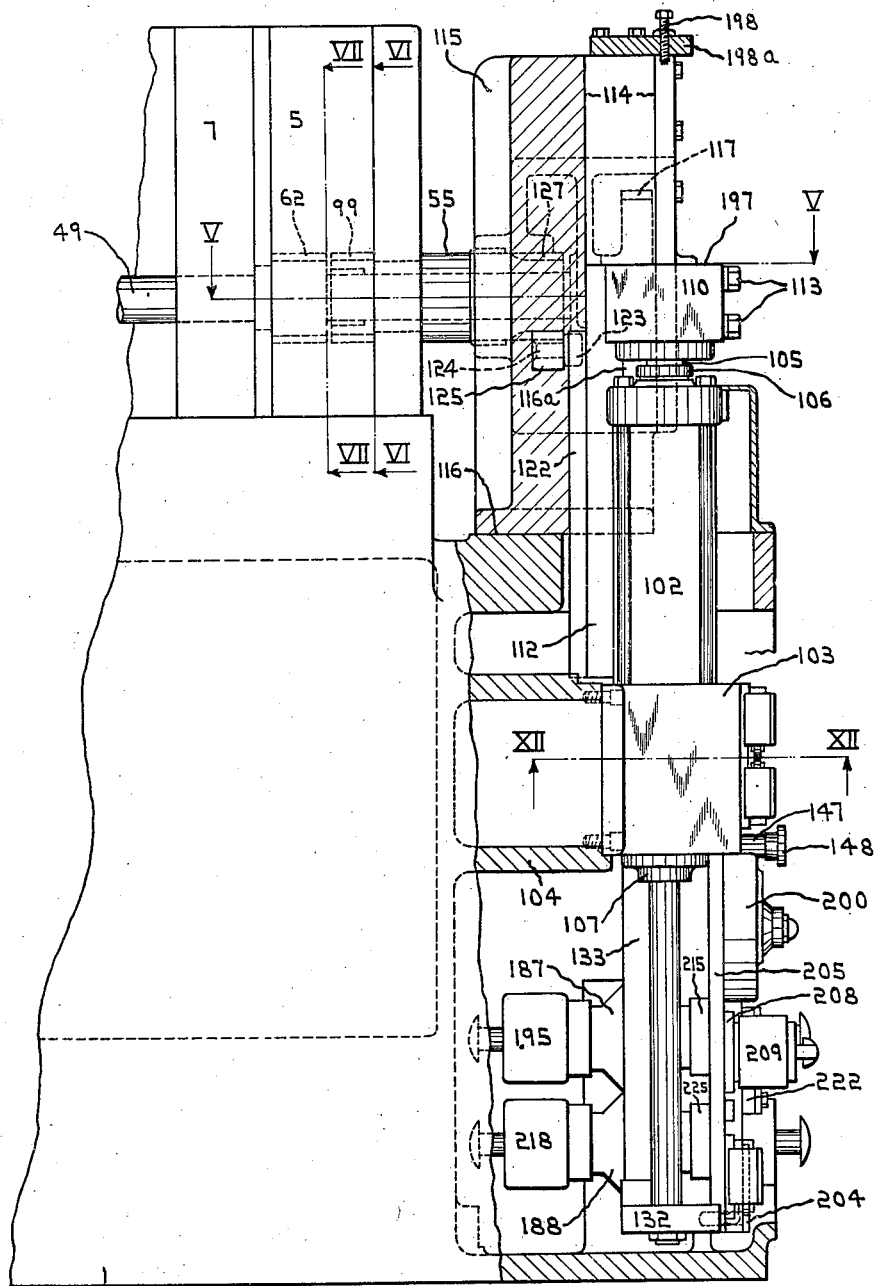
FIG. IX

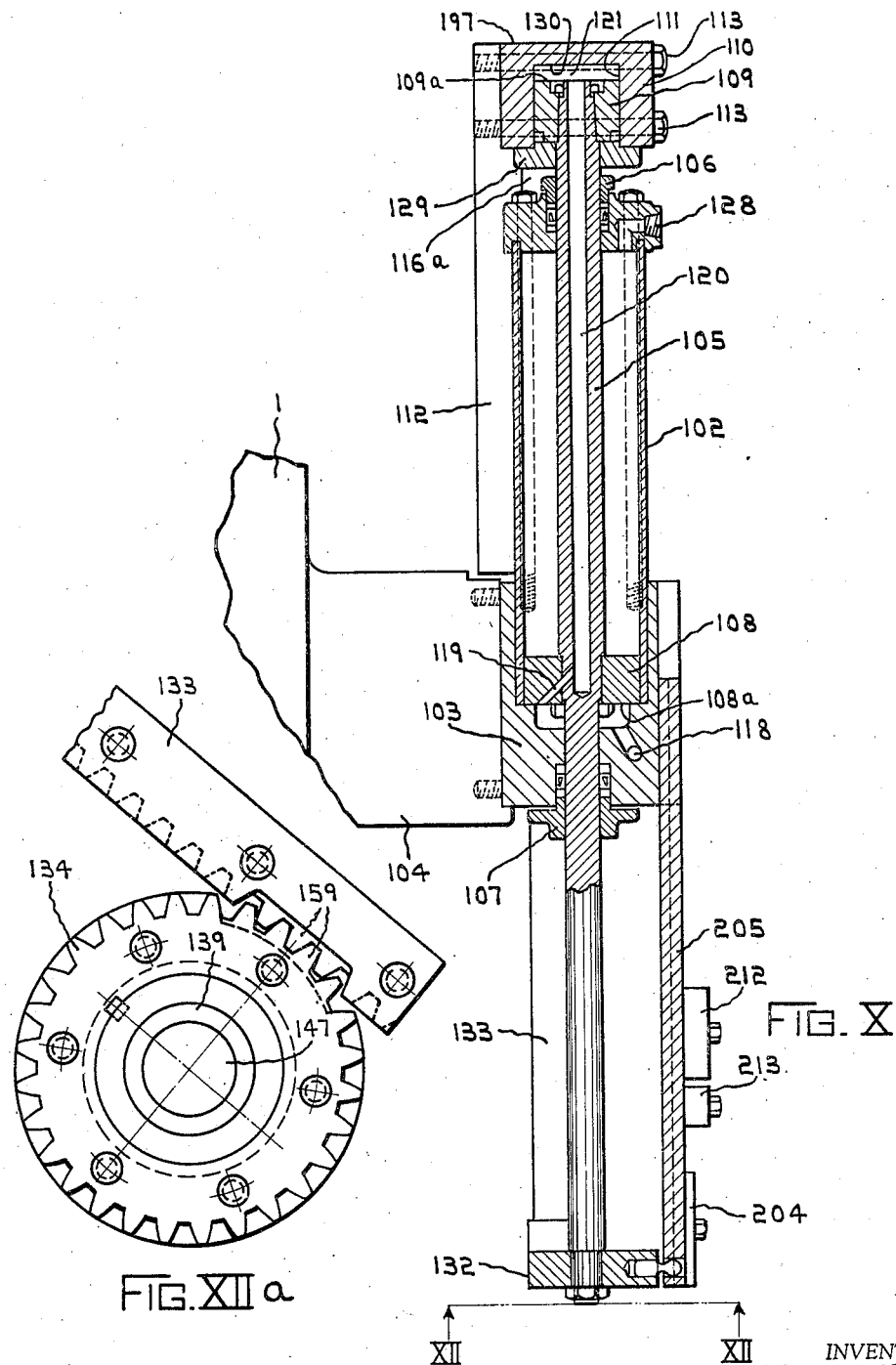

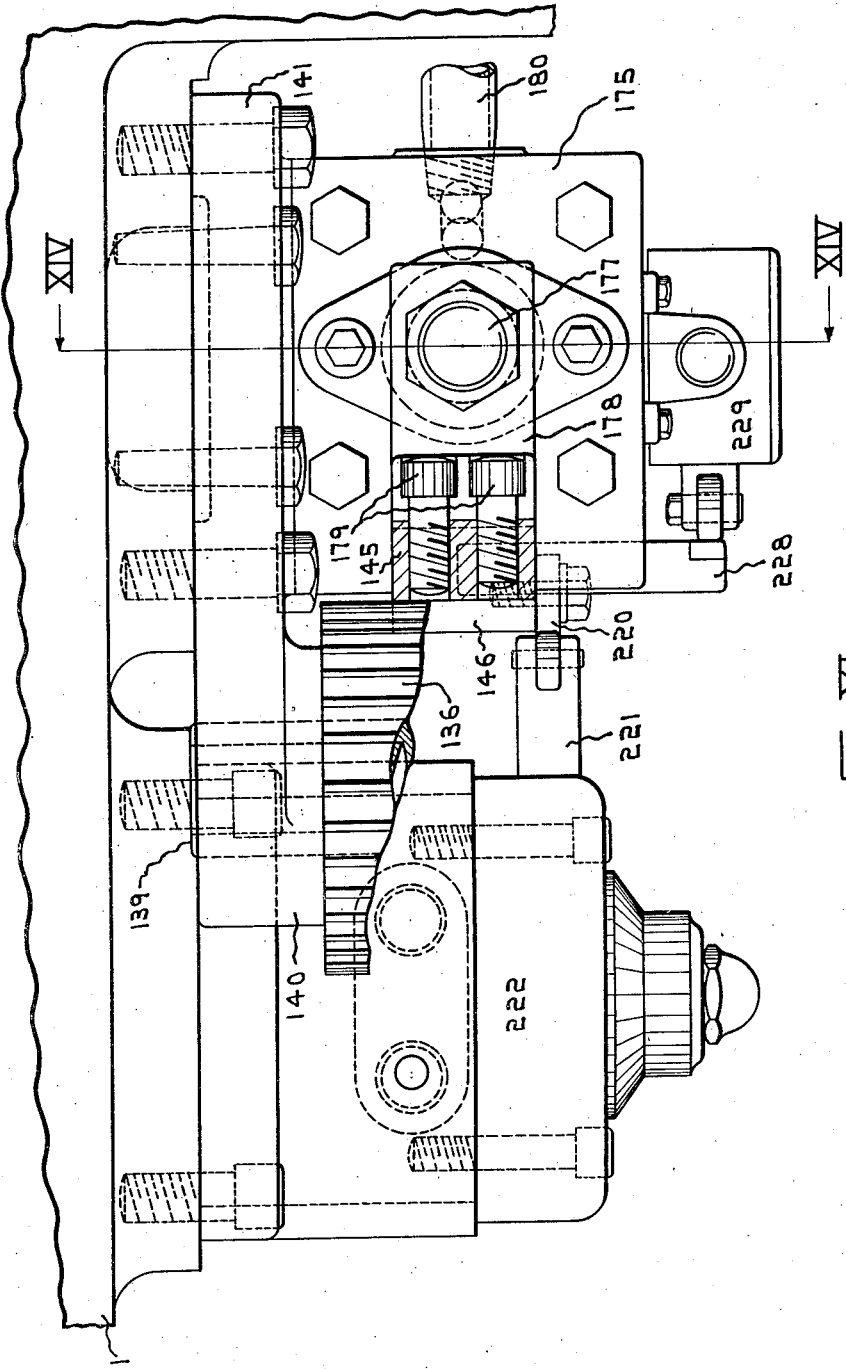

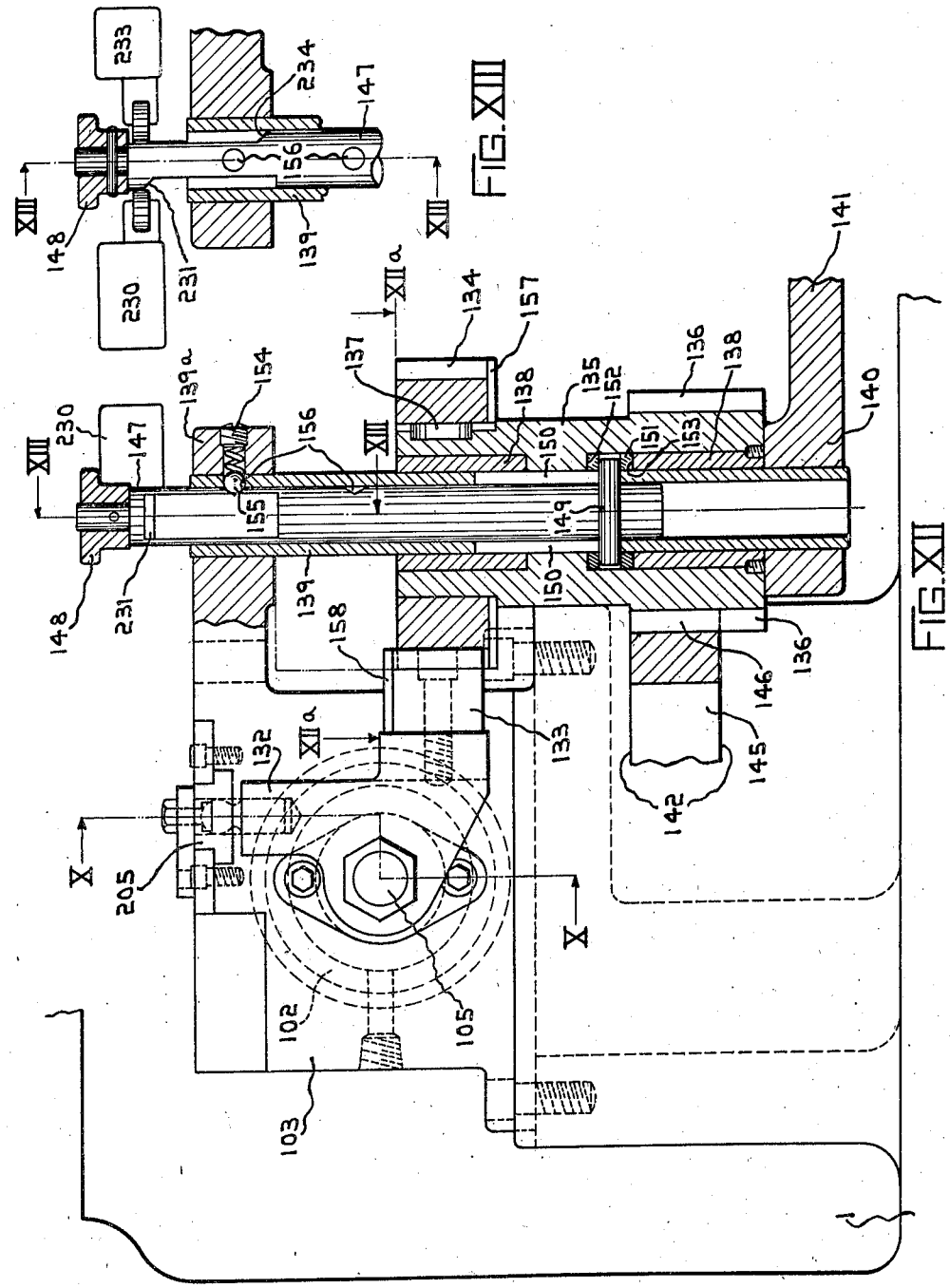

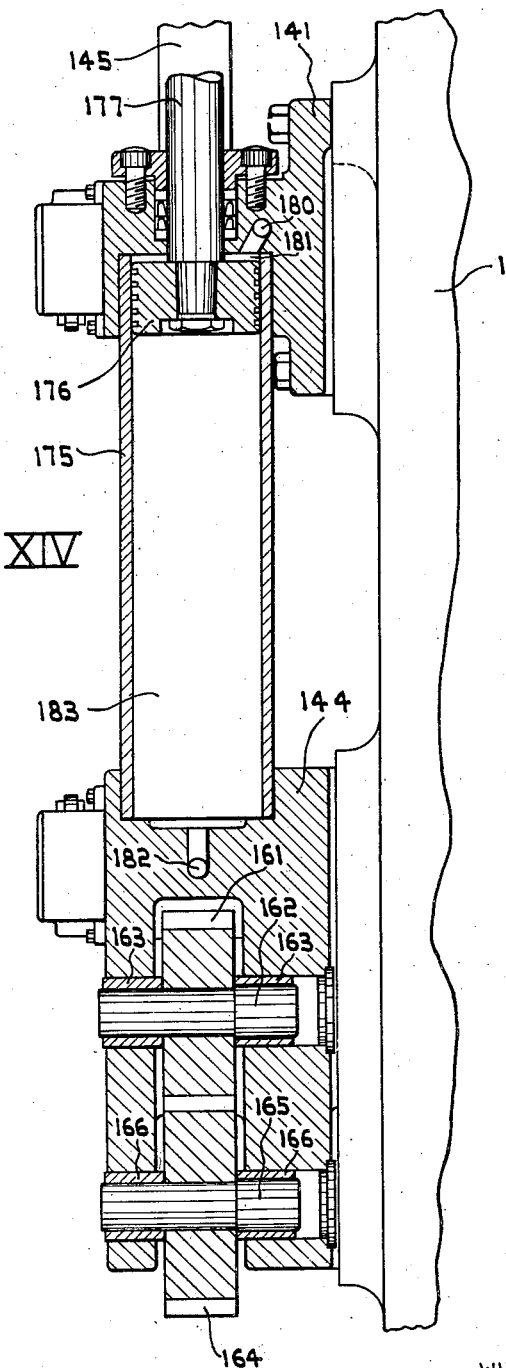

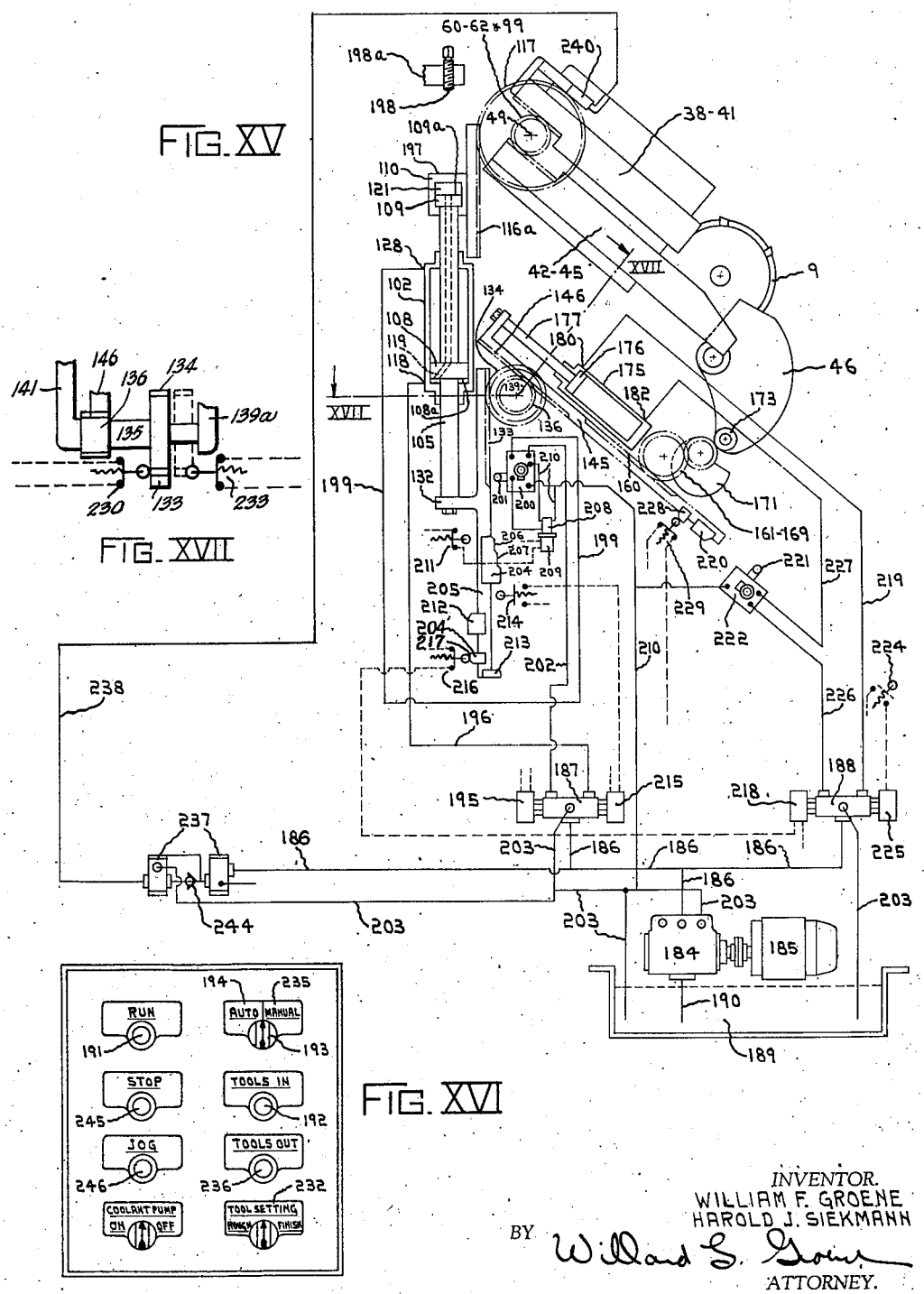

Patented Jan. 6, 1942

2,269,368

UNITED STATES PATENT OFFICE 2,269,368

HYDRAULIC FEEDING MECHANISM

William F. Groene and Harold J. Siekmann, Cincinnati, Ohio, assignors to The R. K. Le Blond Machine Tool Company, Cincinnati, Ohio, a corporation of Delaware Application January 31, 1940, Serial No. 316,610

23 Claims. (Cl. 82—9)

This invention pertains to feeding mechanism for machine tools and is particularly related to hydraulic feeding mechanism for actuating the cutting tools of lathes. The particular type of lathe here shown for illustrative purposes is that of a crankshaft lathe for simultaneously turning all of the line bearing portions of crankshafts to highly accurate finish dimensions.

The object of this invention is to provide a hydraulic feeding mechanism for actuating a series of roughing tools and a series of finishing tools in such a lathe for roughing out and finishing the line bearing portions of a crankshaft. Such a feeding mechanism of this invention is applicable to machines of a character for example as shown in application 271,304, filed May 2, 1939, now Patent No. 2,191,935, issued February 27, 1940, in which a series of oppositely moving roughing tools go down on the work and rough off the excess material while a series of finishing tools follow up these roughing tools and finish machine the bearing portions roughed out by the roughing tools.

One of the chief objects of this invention is to provide independent hydraulic motive means for the roughing tools and for the finishing tools, properly coordinated with suitable electric hydraulic control apparatus whereby each of these sets of tools may be operated independently of each other or conjointly in a predetermined sequential relationship so as to effect the maximum efficiency of the various roughing and finishing operations to be undertaken in the machine.

Another object of this invention is to provide in conjunction with the feeding mechanism for the roughing tool feeding devices, rack and pinion mechanism actuated by hydraulic motive means so constructed that the various tool feeding devices of the roughing tools may be operated at different times and with different extents of travel from a common rack pinion shaft.

It is also an object of this invention to provide rack and pinion mechanism for a pair of opposed tool feeding devices in which delayed action may be effected in one or both of the tool feeding members independent of the motive means for actuating the rack pinion.

A still further object of this invention is to provide hydraulic fluid pressure feeding mechanism for the tool feeding devices in which a separate hydraulic cylinder is used for the roughing tool slide from that of the hydraulic cylinder used for the finishing tool feeding devices and in which overtravel may be effected in the roughing tool feeding cylinder after the roughing tool slide has been moved to full feed in position against a positive abutment, which overtravel permits further operation of the finishing tool slide to advance its finishing tools slightly deeper into the work to be turned to perform a finishing operation relieving the work from the roughing tools.

Further object of this invention is to provide in a lathe having a series of roughing tools and a series of finishing tools, independent hydraulic motive means for each of said sets of tools in which the hydraulic motive means for the roughing tools is mechanically connected to the finishing tools independent of the hydraulic motive means for said finishing tools whereby overtravel of said hydraulic motive means for the roughing tool effects operation of the finishing tools for final sizing of the work independent of the roughing tools.

A still further object of this invention is to provide in a lathe, having a series of roughing tools and a series of finishing tools, a hydraulic motive means for the roughing tools and a hydraulic motive means for the finishing tools and mechanical means interconnecting the hydraulic motive means for the roughing tools with the finishing tools so that they may be actuated from the hydraulic motive means for the roughing tools. Also, means is provided whereby the hydraulic motive means for the finishing tools may be operated independently of the hydraulic motive means for the roughing tools to effect independent operation of the finishing tools.

Further features and advantages of this invention will appear from the detailed description of the drawings in which:

Fig. I is a left hand end elevation of a typical center drive crankshaft lathe incorporating this novel feature of this invention.

Fig. II is a diagrammatic view showing the application of the roughing tools in the machining of the line bearing portions of a crankshaft in the lathe of Fig. I.

Fig. III is a diagrammatic view showing the application of the finishing tools to the line bearing portions of the crankshaft shown in Fig. II.

Fig. IV is a right hand end view in section through the machine on the line IV—IV of Figs. II and III.

Fig. V is a rear elevation of the roughing tool bar units and associated rack and pinion mechanism and the driving mechanism therefore partly in section on the line V—V of Figs. I, VI, VII, VIII, and IX.

Fig. VI is a fragmentary vertical section on the line VI—VI of Figs. V and IX, showing the rack and pinion mechanism for the flange facing tool bars.

Fig. VII is a fragmentary vertical section on the line VII—VII of Figs. V and IX, showing the rack and pinion mechanism for the tool bars for the flange end line bearing tools.

Fig. VIII is a vertical fragmentary section on the line VIII—VIII of Fig. V showing the rack and pinion mechanism for actuating the tool bars having the tools to turn the stub end portion and center bearing portion of the crankshaft.

Fig. IX is a fragmentary rear view of a portion of the lathe on the line IX—IX of Figs. I and V.

Fig. X is a section through the hydraulic feeding cylinder and associated mechanism for the roughing tool bars on the line X—X of Figs. I, V, and XII.

Fig. XI is an end view of the hydraulic feeding cylinder for the finishing tool cradle on the line XI—XI of Fig. I.

Fig. XII is a bottom view of the vertical hydraulic feed cylinder for the roughing tool bars, partly in section on the line XII—XII of Figs. I, IX, and X.

Fig. XIIa is a section on the line XIIa—XIIa of Fig. XII showing the interference mechanism for the interconnecting compound gear for the roughing and finishing tool feeding mechanisms.

Fig. XIII is a fragmentary sectional view of the mechanical interlock control mechanism substantially on the line XIII—XIII of Figs. I, and XII.

Fig. XIV is a sectional view of the hydraulic feeding cylinder and associated mechanism for actuating the finishing tool cradle substantially on the line XIV—XIV of Figs. I and XI.

Fig. XV is a circuit diagram showing the interrelation of the various hydraulic, electric, and mechanical devices for carrying out the various functions and operations of this feeding arrangement.

Fig. XVI is a view of the electrical control switch station for the lathe for rendering the various functions operative.

Figure XVII is a diagrammatic view shown on the line XVII—XVII of Figure XV.

*General organization*

This invention is shown applied to a machine of a character, for example, as shown in application Serial No. 271,304, filed May 2, 1939, now Patent No. 2,191,935 issued February 27, 1940, which is a typical double center drive crankshaft line bearing turning lathe. The machine comprises a base 1, having an inclined surface 2 upon which are mounted the tool bar units 3, 4, and 5, Fig. V, the center drive ring gear chuck housings 6 and 7, and appropriate tailstocks 8, Fig. I.

Power for rotating the center drive ring gears 9 in the housings 6 and 7, is derived from the main drive motor 10 which transmits its power through the motor pulley 11, the belt 12, to the driving pulley 13 on the pulley shaft 14, journaled in the frame of the lathe in appropriate bearings. On this pulley shaft 14 and connected with the pulley 13 is the pinion 15 which drives the gear 16 fixed on the drive shaft 17 also journaled in the frame of the lathe. On this drive shaft 17 are mounted appropriate pinions 18 which drive idler gears 19 which are in mesh with the center drive gears 9 so that these center drive gears may be rotated in synchronism by means of the main drive motor 10. Appropriate chucking means 9a Fig. IV, is provided in the bore 20 of the center drive ring gears for appropriately gripping the crankshaft to be turned in the lathe.

Referring particularly to Figs. II, III and IV in Fig. II, is shown the application of the roughing tools RT to the various line bearings 21, 22, and 23, the flange end 24 and the stub end 25 of a crankshaft W, having the pin bearings 26, 27, 28 and 29 inter-connected with these line bearing portions by webs 30, 31, 32, 33, 34 and 35. The crankshaft is supported on appropriate centers 36 and 37, in the tailstocks 8 and is chucked by suitable chucking mechanism engaging the webs 31 and 34 in the center drive ring gears 9.

These roughing tools RT are carried in a series of upper tool feeding bars 38, 39, 40 and 41 and in the lower tool bars 42, 43, 44 and 45 in the respective tool carrier units 3, 4, and 5, as best seen in Fig. V. Associated with these roughing tools are the finishing tools FT which are adapted to finish machine to accurate dimensions the various line bearings 21, 22, and 23 and the flange and stub portions 24 and 25 of the crankshaft W. These finishing tools are best shown in Figs. III and IV and are carried on a finishing tool feeding cradle 46 which is pivotally mounted on suitable trunnions 47 on the frame of the lathe so that the various finishing tools FT mounted on tool supporting portions 48 may be swung to and from the crankshaft W to effect the finish cutting action, this arrangement of tooling being substantially like that of the above mentioned application Serial Number 271,304, filed May 2, 1939.

*Rack and pinion feeding mechanism*

An object of this invention is to provide a new and more efficient type of feeding mechanism for actuating these roughing tool bars and the finishing tool feeding cradle in coordinated movement with the view of obtaining a higher production and a greater degree of accuracy for the work crankshaft W to be machined. The upper and lower roughing tool bars are actuated in opposite reciprocatory motion in the various tool carrier units 3, 4, and 5 by rack and pinion mechanism shown particularly in Figs. V, VI, VII and VIII. Noting Fig. V the rack pinion shaft 49 is journaled in appropriate bearings 50, 51 and 52 in the machine frame and also in the bearings 53 and 54 of the pinion sleeve 55 which in turn is journaled in bearings 56 and 57 of frame. The outer end of this shaft 49 is further supported in bearings 58 and 59 of the machine frame. On this shaft 49 are formed integral pinions 60, 61 and 62 which respectively engage racks on the roughing tool bars in the tool carrier units 3, 4 and 5.

Noting Fig. VIII, the pinion 60 actuates the tool bars 41 and 45 in the tool carrier unit 3. On the tool bar 41 is adjustedly mounted the rack 63 by suitable tongues 64 in slot 65 formed in this bar 41. This rack 63 is adjustable for accurate positioning of the bar 41 to effect proper sizing of its tools carried thereon and which adjustment is controlled by means of a set screw 66 threaded in a bore 67 in the tool bar 41 and which has a locking screw 68 passing telescopically through the screw 66 and threaded in the rack 63 by a suitable tapped hole 69, so that by appropriately loosening the set screw 68 and rotating the screw 66 the rack 63 may be accurately set relative to the bar 41 for accurately positioning its tools relative to the work.

On the lower tool bar 45 is slidably mounted a rack 70 which slides along the surface 71 of this tool bar 45 and is confined sidewise by usual side plates 72 and 73 of the tool carrier unit 3. The sliding movement of this rack 70 is limited in the direction for returning the tools of this bar away from the work by its surface 74 striking the surface 75 of the bar 45. Its sliding movement in the opposite direction, that is, in the direction for moving the tool bar 45 with its tools, to the work for sizing of the work diameters, is limited by the adjustable abutment set screw 76. Its end 77 is adapted to engage the surface 78 of the rack 70 to cause the tool bar 45 to be fed upwardly to draw its roughing tools RT into the work. The tool bar 45 has an abutment block 79 fixed to its rear end portion 80 by appropriate screws 81 and project downwardly and rearwardly with a surface 82 which is adapted to engage an abutment plunger 83 in a bore 84 in the tool carrier unit 3, this plunger being yieldingly mounted by means of a relatively stiff compression spring 85.

The operation of this particular arrangement is substantially as follows: as shown in Fig. VIII, the tool bars 41 and 45 are fully retracted with their tools away from the work crankshaft W. The rack pinion shaft 49 is then rotated clockwise as indicated to affect the feeding in of these tool bars and their tools toward the work. By rotating the pinion 60 as indicated by the feed arrow on this figure, the bar 41 immediately starts to move downwardly to bring the roughing tools on the upper tool bar toward the work, since there is no relative sliding movement between this rack 63 and its tool bar 41. However, at the same time, the rack 70 slides along on the surface 71 without moving the bar 45 upwardly to bring its tools into cutting position. After some time of feeding action of the bar 41 toward the work, the rack 70 then has been moved upwardly a sufficient amount so that its surface 78 engages the surface 77 of the abutment screw 76, whereupon the bar 45 will be picked up by the feeding movement of the rack 70, causing it to feed its tools toward the work W. Continued rotation of the pinion 60 in feeding motion ultimately brings these tool bars with their tools down to finish size as limited by the accurate stopping of the rotation of the shaft 49 by mechanism to be described later.

After the completion of this feeding movement, the pinion 60 is then reversed in rotation, whereupon the bar 41 is immediately returned backwardly and upwardly withdrawing its tools away from the work. However, the rack 70 on the lower tool bar 45 will first slide in the opposite direction on the surface 71 until its surface 74 engages surface 75 of this bar and will then cause this bar to move to its retracted position and will continue to move thus until the surface 82 of the abutment block 79 fixed on this tool bar 45 engages the abutment plunger 83, the object of this arrangement being to make sure that the tool bar 45 will be held in feeding direction yieldingly against movement of the rack 70 so that the surfaces 74 and 75 of the rack 70 and bar 45 will be in proper engagement before the beginning of the next cutting cycle. Thus by this arrangement we have provided a rack and pinion mechanism for actuating a pair of oppositely reciprocatable tool bars in which the extent of travel of one of the bars is effected in a lesser or greater degree while using a common pinion engaging racks on each of said tool bars.

By this arrangement a delayed action of one or more of the reciprocating tool bars is also effected.

In a similar manner the tool bars in the tool carrying unit 4 are likewise actuated by rack and pinion mechanism like that of the mechanism just described for the tool carrier unit 3.

Noting Fig. VII, this shows the rack and pinion mechanism for actuating the tool bars 39 and 43 for the roughing tools for the flange end line bearing 21 and the associated oil slinger grooves. Generally, in this construction it differs from that just described for the tool carrier units 3 and 4 in that both of the racks are slidably mounted for delayed action of the tool bars 39 and 43. On the tool bar 39 is slidably mounted the rack 86 in a suitable T slot guideway 87 formed in the bar 39. The inward or feeding sliding movement of the rack 86 is limited by engagement of the surface 88 of the lock washer 89 appropriately carried on the threaded end 90 of the rack 86 by appropriate lock nuts 91 against the surface 92 of the abutment block 93 fixed to the rearward portion 94 of the tool bar 39 by the screws 95, these lock nuts 91 being adjustable to effect accurate positioning of the tool bar 39 for proper setting of its tool relative to the work. Its rearward or reverse feeding sliding movement of the rack 86 is limited by engagement of the surface 96 of the rack 86 engaging the opposite surface 97 of the abutment block 93 for withdrawing the tool bar 39 from the work piece W. The construction and operation of the sliding movement of the rack 98 slidably mounted on the surface 71 of the tool bar 43 is substantially the same as that of the rack 70 on the tool bar 45 as described in Fig. VIII.

Thus with this arrangement of Fig. VII we have provided a combination in which both of the tool bars 39 and 43 have delayed action. In this arrangement the pinion 62 is actuated in feeding movement clockwise whereupon the respective racks 86 and 98 slide along their respective slide ways 87 and 71 until the surface 88 engages surface 92 and the abutment surface 78 engages the end 77 of the screw 76 causing the bars 39 and 43 to be picked up and moved in feeding movement toward the work. At the completion of the feeding in cycle the pinion 62 is reversed in rotation whereupon the racks 86 and 98 move to the position on the bar as indicated in Fig. VII and thus engage the respective surfaces 97 and 74 picking up the bars to return them from engagement with the cutting tools on the work to withdraw them to the fully withdrawn position shown in Fig. VII. Thus in this particular of Fig. VII both rack and pinion means are slidingly mounted on the respective tool bars so that both bars are given a delayed forward and return movement.

Referring now to Fig. VI, here is shown the rack and pinion mechanism for actuating the tool bars 38 and 42 carrying the roughing tools for machining the outside face of the flange end 24 of the crankshaft W. In this arrangement a pinion 99 is formed on the pinion sleeve 55 rotatable on the bearings 53 and 54 on the shaft 49. The pinion 99 is arranged to engage rack 100 and 101 both of which are fixedly mounted by adjustable means like that described for the rack 63 in Fig. VIII, each of said racks 100 and 101 being slightly adjustable for accurate setting of the tool bars 38 and 42 to accurately position their roughing tools to accurate dimensions. The lower tool bar 42 is also provided with the resilient abutment plunger 83 engaging the block 79 fixed on its rearward portion 81 as in the case of the other lower tool bars.

Noting now collectively all of the Figs. VI, VII and VIII it will be noted that we have here a unique rack and pinion mechanism for feeding series of oppositely reciprocatable tool bars wherein certain of the tool bars may be given delayed action over other of said tool bars. It is also to be noted for example, that the pinions 60, 62 and 99 may be made of different pitch diameters or number of teeth whereby the various tool bars of the different series of tool carrier units 3, 4 and 5 may be fed at different rates and distances of travel as determined by these various pinion diameters carried on the shaft 49 or on the sleeve 55. For example, specifically comparing the pinions 60 and 62, the difference in their diameters will cause the tool bars 39 and 43 to feed much more rapidly than those of the tool bars 41 and 45 with a constant speed of rotation of the rack pinion shaft 49, and in conjunction with this differential movement effected by means of different size pinions on the same rack pinion shaft, the sliding delayed action mounting means of the rack 86, 98, Fig. VII permits of the proper timing of these tool bars with respect to one another in the various tool units so as to permit the tools on all of the tool bars to finish up at the same time but while operating at different rates of speed.

It is also to be noted that with this rack and pinion arrangement we have a rack pinion sleeve 55 which may be actuated independently of the rotation of the shaft 49 so that the bars 38 and 42 may be operated at still different rates of feed from that produced from the continued combination just described for the tool units 3 and 4, this rack pinion sleeve 55 being operated by independent actuating mechanism at variable rates of speed while the shaft 49 is actuated at constant rate for effecting constant feed rates in the other tool bars.

Hydraulic actuating mechanism

A hydraulic fluid pressure cylinder 102 mounted in an appropriate bracket 103 fixed to the projection 104 of the machine frame serves to rotate the rack pinion shaft 49 and the pinion sleeve 55 for reciprocating the various roughing tool bars in the tool carrier units 3, 4, and 5. This cylinder 102 (Figs. IX and X) has a piston rod 105 extending outwardly through suitable packing 106 and 107 from each end of cylinder and has a piston 108 fixed on this rod 105 and reciprocatably operating in the cylinder 102. On the upper end of the piston rod 105 is fixed a piston 109 of smaller diameter than the piston 108 carried in a cylinder block 110 for relatively small reciprocatory movement in the bore 111 formed in this cylinder block 110. To this cylinder block 110 is bolted the cam plate 112 by suitable screws 113. This cam plate is reciprocatably mounted in suitable guide ways 114 in the housing 115 appropriately mounted on the surface 116 of the machine frame of the lathe. Appropriately fixed to this cam plate 112 is the roughing tool feeding rack 116a which engages the gear 117 fixed on the rack pinion shaft 49. Thus as fluid pressure is applied in the cylinder 102 (Fig. X) through the port 118 the piston 108 and the piston rod 105 will be moved upwardly. Fluid pressure from the port 118 will also pass through the passageway 119 in the piston 108 and rod 105 and through the hollow bore 120 in the piston rod 105 into the bore 111 in the cylinder block 110. Fluid pressure will thus fill the chamber 121 to form a substantially rigid abutment in which the piston 109 may exert its pressure thus raising the cylinder block 110 and sliding the cam plate 112 upwardly in the guide ways 114 in the housing 115, moving its rack 116 upwardly to rotate the gear 117 and thereby the various pinions 60, 61 and 62 on the shaft 49.

In order to actuate the pinion sleeve 55, a cam bar 122, (Figs. I, V and IX) is mounted on the cam plate 112 and engages rollers 123 appropriately journaled on studs 124 fixed to the horizontally reciprocatable feeding rack 125 appropriately slidably mounted in suitable guide ways 126 in the housing 115, this rack 125 engaging the pinion 127 formed on the pinion sleeve 55. This cam bar 122 may be so arranged as to provide a variable feeding rate for the rack 125 and thereby the sleeve 55 and the associated tool bars 38 and 42 as the cam plate is moved upwardly by means of the cylinder 102 as described.

The various roughing tool bars may be returned to retracted position by applying fluid pressure in the port 128 of the cylinder 102, at which time the piston 109 will contact the packing gland 129 as shown in Fig. X to return the cam plate 112 and rack 116a to initial starting position.

Appropriately guided at its upper end in a suitable guide way 131 in the bracket 103 and connected by a block 132 to the lower end of the piston rod 105 is a vertical finishing tool feeding rack 133 (Figs. I, IX and X). This rack 133 is adapted to engage the larger gear 134 Fig. XII, of the sliding compound gear 135 comprising the pinion gear 136 and the gear 134 appropriately keyed at 137 and fixed to the compound gear 135 which is rotatably and slidably mounted on suitable bushings 138 on the tubular shaft 139 which is fixed in the projecting arm 139a of the bracket 103 and the projecting arm 140 of the bracket 141, Fig. XIV, fixed to the base 1 of the lathe. In appropriate guide ways 142 formed in the bracket 141 and in similar guide ways in the bracket 144 is slidably mounted the rack bar 145 having a rack 146 cut integral therewith which engages with the pinion 136 of the compound sliding gear 135 so that vertical reciprocation of the piston 108 and rod 105 in cylinder 102 effects rotation of the compound gear 135 and movement of the rack bar 145.

These respective racks 133 and 146 may be connected or disconnected with each other by sliding this compound gear 135, Fig. XII, on the tubular shaft 139 by means of the actuating rod 147 having the pull knob 148 fixed on its outer end and having a pin 149 fixed in its inner end and operating lengthwise of the tubular shaft 139 in the slot 150 to similarly axially reciprocate the collar 151 to cause it to bear against either the surface 152 of the compound gear 135 or the surface 153 of its integral bushing 138 to effect said sliding movement in the compound gear 135. Suitable detent means 154 comprising the spring urged detent ball 155 engaging the detent holes 156 serve to accurately position the compound gear 135 axially of the shaft 147. This compound gear 135 is so designed that as it is moved upwardly, as seen in Fig. XII, gear 134 may be slid out of mesh with the rack 133, the gear 136 remaining in engagement with the rack 146 to facilitate re-engagement of the gear 134 with the rack 133 when it is desired to operate both of these racks 133 and 146 simultaneously.

This interconnection of the racks 133 and 136 is provided with an interlocking mechanism whereby the gear 134 may only be engaged or disengaged with the rack 133 when both these racks are in fully retracted position with all of the cutting tool feeding devices fully withdrawn from the work crankshaft W. This is accomplished by means of the mechanism particularly shown in Fig. XII and XIIa and consists of an interference disc 157 fixed on the gear 134 and its interference bar 158 provided on the rack 133 which covers over the gear and rack respectively except for cutout portions 159 provided in these interference members which may be brought into alignment only at the time the tool feeding devices are all fully retracted from the work. At any other time the gears 134 on the compound gear cannot be shifted by the rod 147 as the gear teeth on the gear 34 will strike the interference bar 158 on the rack 133 unless the tool feeding members are thus fully withdrawn to the precise position shown in Fig. XIIa.

Also formed integral with the rack bar 145 is the rack 160 which is adapted to engage the idler gear 161 fixed on the pin 162 suitably journaled in bearing 163 in the bracket 144, this idler 161 in turn driving another idler gear 164 similarly fixed on a stud 165 appropriately journaled in bearings 166 in this bracket 144. The gear 164 through an idler gear 167, Fig. I, appropriately journaled on a stud 168 fixed in the base 1 of machine drives the cam shaft gear 169 fixed on the cam shaft 170 containing the involute cam 171 whose periphery 172 engages rollers 173 journaled on the bottom of the cradle 46 on pins 174 whereby rotation of the shaft 170 by movement of the rack bar 145 effects swinging feeding movement in the cradle 46. Thus in this arrangement with the compound gear 135 shifted as shown in Fig. XII with both gears 134 and 136 respectively engaged with the racks 133 and 146 the roughing tool bars and the finishing tool feeding cradle are simultaneously fed to and from the work by reciprocation of the piston 108 in the feed cylinder 102.

Mounted in the brackets 141 and 144, noting Fig. XIV, is the fluid pressure cylinder 175 having a piston 176 connected to the piston rod 177, the outer end of which rod is appropriately connected to the upper end of the rack bar 145 by suitable bracket 178 bolted thereto by means of the screws 179. With the gear 134, Fig. XII, disengaged from the rack 133, fluid pressure may be applied through the port 180 into the piston rod chamber 181 of the cylinder 175 causing the piston to move the rack bar 145 to effect its feeding of the finishing tool chadle 46 through the various idler gears and cams 171 as described feeding of the finishing tool cradle 46 through the port 182 into chamber 183 of the cylinder 175 the rack bar 145 may be returned upwardly to allow the finishing tool cradle to return its finishing tools to retracted position.

*Operation and control*

The operation of this apparatus may be undertaken in three chief ways:

1. The simultaneous operation of both the roughing tools and the finishing tools to complete the machining operation of the work.
2. The consecutive operation of first applying the roughing tools to the work, retracting them and then applying the finishing tools to the work and retracting them to complete the machining operation.
3. The operation of either the roughing tools or the finishing tools as independent operations.

Fluid pressure for actuating the respective feeding cylinders 102 and 175 is derived from the fluid pressure pump 184 which is driven by a suitable electric motor 185, Fig. XV, which delivers fluid under high pressure through the line 186 connected to the roughing tool feed control valve 187 and the finishing feed control valve 188, the fluid pressure pump 184 being charged with fluid from the fluid reservoir 189 through a suitable line 190.

Under the conditions of simultaneous operation for the roughing and finishing tools the center drive ring gears 9 of the lathe are set in motion by starting the main drive motor 10 by pressing the run button 191 of the control panel, Fig. XVI, which energizes appropriate electrical apparatus for setting this motor 10 in operation in the usual and conventional manner. Having thus pressed the run button to get the work spindles 9 rotating the tools "in" button 192 is then pressed, the selector switch 193 being set in the "automatic" position 194. When the tools "in" button 192 is pressed the tools "in" solenoid 195 of a roughing tool control valve 187 is energized through suitable electrical apparatus, commonly used for such purposes, whereupon the valve 187 is operated to connect pressure from line 186 to line 196 causing fluid pressure to be delivered into the port 118 of the cylinder 102. This causes the piston 108 in the cylinder 102 to rise with the rod 105 causing the rack 116a and 133 to move upwardly in feeding direction. It is to be understood that during the simultaneous operation cycle the compound gear 135, Fig. XII, is shifted as shown in this figure to engage the respective gears 134 and 136 with the racks 133 and 146 so that movement of the rack 133 effects similar movement in the rack bar 145 for actuating the finishing tool cradle 46 simultaneously with the operation of the roughing tool bars as actuatd by the shaft 49 through the gear 117 moved by the rack 116a.

It is to be noted, referring to Fig. X, that fluid pressure from the port 118 also passes through the passageways 119 and 120 in the piston 108 and piston rod 105 so that pressure will likewise be distributed in the chamber 121 of the cylinder block 110. An important and distinctive feature of the invention lies in the particular construction of this feeding cylinder arrangement shown in Fig. X in which the area of the head of the piston 108 is greater than that of the piston 109. The area of the piston 109 is so calculated under the pressure utilized in the chamber 121 that it is sufficient to raise the cylinder block 110 and its associated rack for actuating the roughing tool bars in cutting action while maintaining this chamber 121 as shown in Fig. X. In other words, the area of the piston 109 in the chamber 121 is sufficient to overcome any resistance which may be imparted to the cylinder block 110 to compress fluid out of the chamber 121 during the normal roughing feed cutting action of the roughing tool bars with their tools on the work crankshaft.

However, as this piston 108 is fed upwardly toward the end of the cutting stroke the cylinder block 110 has its surface 197 abut against an abutment screw 198 suitably adjustably mounted in the block 198a fixed to the housing 115. When this block 110 strikes the abutment screw 198 it is arrested against further movement which brings the roughing tools to proper depth and fixed dwell position. The piston 108 continues to move upwardly after surface 197 strikes the screw 198 compressing fluid out of the chamber 121 back through the passageways 120 and 119, the area of the piston 108 being greater than that of 109 so that the pressure exerted by the piston 108 is in excess of that which may be exerted in the opposite direction by fluid pressure in the chamber 121 by the piston 109. In this way the cylinder rod and piston 108 have an "overtravel" or continued relative movement after the roughing tools have been brought against stop screw 198 as described but after the completion of the cutting operation by the roughing tools. This continued overtravel movement of the piston rod 105 causes the rack 133 to continue to move and thereby bring the finishing tools into final operation to finish size and accurately finish the crankshaft bearing portions down below the size roughed out by the roughing tools on the roughing tool bars. Thus with this arrangement we are able to provide automatic dwell for the roughing tools and also to provide a means whereby the finishing tools may be fed after the roughing tools have been arrested in feeding motion for final sizing up and accurate finishing of the various bearing portions roughed out by the roughing tools.

In order to control the rate of feed or upward movement of the piston 108 in the cylinder 102 fluid pressure exhausted from the port 128 of the cylinder 102 during the upward feeding movement of the piston 108 passes through the line 199 to the feed rate control valve 200 which has the usual control stem 201 which may be pushed inwardly or allowed to move outwardly to vary the rate of discharge from the port 128 and thereby control the rate of relative feeding of the piston 108 in the cylinder 102. Exhaust from this feed control valve 200 passes through the line 202 back through the control valve 187 where it is connected to the drain line 203 for returning of this discharge fluid back to the fluid pressure reservoir 189.

When the tools "in" button 192 is first pressed, fluid pressure is supplied from the pump 84 at relatively high volume and feed as limited by the discharge from the port 128 of the cylinder 102 by the feed rate control valve 200 with its stem 201 fully extended so that the cutting tools are first rapid traversed toward the work at relatively high speed. After proceeding a considerable distance to initial work engaging position of the tools, the control dog 204 carried on a bar 205 attached to the block 132 for movement with the movement of the piston rod 105 has a surface which engages the plunger 201 of the feed control valve 200 depressing this plunger so as to effect a coarse feeding of the tools as they begin to cut upon the work W. Further continued movement of the piston and rod 105 upwardly brings the surface 207 into engagement with the plunger 201 of the control valve 200 so as to again restrict the outward discharge from the port 128 of the cylinder 102 to effect the fine feed of the roughing tools down to the point of completion of the rough cutting at which time the cylinder block 110 strikes the abutment screw 198 effecting the dwell in the roughing tools. During this simultaneous operation the finishing tools likewise are conducted through the same period of decreasing feed rate period since the interlocking of the gearing through the compound gear 135 renders their movement simultaneously effective. It is to be noted that when the plunger 201 of the control valve 200 is on the abutment surface 207 of the actuating dog 204 that the finishing tools will be doing their finish cutting action on the work piece after the completion of the roughing tools so that this finishing is undertaken at relatively fine feed desirable for high degree of accuracy and surface finish on the work piece.

In conjunction with the feed rate control valve 200 is a supplementary bypassing valve for the purpose of prolonging the rapid traverse period, at a lesser rate than the rapid traverse rate but at a greater rate than the coarse feed rate, by independent manual operation, the purpose of which is to more quickly bring the tools up to actual cutting action on the work in the event that the tools could be moved in rapidly a further amount on certain of the rough irregular work pieces than on others so as to gain a maximum output for the machine. This is accomplished by the manual traverse control valve 208 which may be rendered operative by its solenoid 209 by continued holding down of the tools "in" button 192 so that rapid traversing of the tools may be effected beyond the automatic point of stopping of the traverse when the surface 206 strikes the control plunger 201 at the valve 200. By permitting the solenoid 209 and the valve 208 to be energized continuously by holding the tool "in" button permits a larger volume of fluid to escape from the discharge line 199 into the drain line 202 through appropriate lines 210. In order to prevent damage to the tool feeding mechanism should the tool "in" button be accidentally pressed and held down after the tools had fully engaged the work and started in full cutting operation the solenoid 209 of the valve 208 is automatically de-energized by means of a suitable limit switch 211 which is engaged by a trip dog 212 on the rod 205 at a point just at the beginning of the heavy cutting of the cutting tools on the work piece so that the actual cutting operation of the tools cannot be effected by any manual operation of the tool "in" button in so far as increasing the rate of feed or traversing period of these tools during the cutting portion of the cycle. Thus the object of this bypass manually controlled valve is to permit rapid movement inwardly of the tools beyond the normal stopping point which is provided to take care of all types of rough irregular work pieces and to provide a manual means whereby the tools may be moved up until it is noticed they are beginning to contact the work in cutting operation and then to instantly release the tool "in" button to permit the normal feeding to take place thus saving the non-cutting period of tool feeding at coarse feed before getting the tools in actual cutting operation.

After the roughing and finishing tools have been fully fed in to depth for proper sizing of the work, the trip dog 213 on the bar 205 engages the limit switch 214 which, through suitable electrical apparatus, energizes the tools out solenoid 215 of the control valve 187 whereupon fluid pressure from the line 186 is then transmitted to the valve 187, the line 202, freely through the valve body 200 into the line 199 to the port 128 of cylinder 102 causing its piston 108 and rod 105 to move downwardly in the cylinder 102. Back pressure and exhausted fluid from the port 118 passes out through the line 196 to the control valve 187 into the drain line 203 returning to the reservoir 189. Back pressure in this line 196 also again moves the cylinder block 110 upwardly to its initial in feeding position since there is now no resistance upwardly to the movement of this cylinder block and associated rack and feeding mechanism since it has been removed from the abutment screw 198, this pressure passing upwardly through the passageways 119 and 120 in the cylinder rod 105. It is to be noted that during the operation of the simultaneous application of roughing and finishing tools to the work the control valve 188 and associated electrical control mechanism and the finish feeding cylinder 175 are wholly inoperative and have no effect on the operation of the finishing tool cradle 46.

When the apparatus is to be operated in a consecutive manner that is, first application of the roughing tools and then the application of the finishing tools to the work, the compound gear 135 is shifted so that its gear 134 is disengaged from the rack 133 so that there is no mechanical interconnection of the roughing and finishing tool feeding mechanism. Under the consecutive operating method the selector switch 193 is set in the automatic position 194. The run button 191 is pressed to start the spindle motor as in the previous case. The tools "in" button 192 is then pressed effecting upward feeding movement of the piston 108 and the rod 105 of the roughing feeding mechanism as previously described to bring the roughing tool bars toward the work to dwell position with the cylinder block 110 up against the abutment screw 198. Since as the compound gear 135 has been disconnected from the tool rack 133 no actuation of the rack 146 mechanism will take place during the operation of these roughing tools. After the feeding mechanism has moved the roughing tools to dwell position the limit switch 216 is then tripped by surface 217 of the dog 204' on the bar 205 which, through suitable electrical apparatus, energizes the finish tools "in" solenoid 218 of the finish tool control valve 188 whereby fluid pressure from the line 186 passes through the control valve into the line 219 passing into the port 180 of the cylinder 175 causing its piston to move downwardly to actuate the rack bar 145 and through the associated gearing connected thereto to rock the cradle 46 with the finishing tools into the work. As this piston 176 proceeds downwardly in cylinder 175 the feed control dog 220 mounted on the rack bar 145 engages the control plunger 221 of the finishing feed rate control valve 222 to gradually decrease the feed rate from rapid traverse to fine feed in a manner similar to that of the feed rate control valve 200 by appropriately restricting the discharge of fluid from part 182 through line 227 and line 226 through valve 188 to drain line 203. The finishing feeding operation continues with the piston moving downward in the cylinder 175 to the completion of the finish cutting operation with the cradle moving in to dwell with abutment screws 223, Fig. IV, engaging the center drive housing 6 and 7. At this time a limit switch 224 is engaged by the trip dog 220 whereby, through suitable electrical apparatus, the finish tools "out" solenoid 225 is energized to actuate the control valve 188 whereby fluid pressure from the line 186 is connected to the line 226 to pass freely through the control valve 222 and the line 227 to the port 182 of the cylinder 175 to thereby urge the piston upwardly returning the rack 145 and the cradle 46 to retracted position, exhaust fluid passing out through the port 180 of this cylinder 175 through the line 219, the control valve 188, into the drain line 203. As soon as the finishing tools and cradle 46 have reached their fully "out" or withdrawn position, the trip dog 228 on the rack bar 145 engages the limit switch 229 which, through suitable electrical apparatus, arrests rotation of the main drive motor and brings the spindle 9 to a stop preparatory to unloading the work and loading a new piece into the lathe.

When the compound gear 135 is moved to the position of simultaneous engagement with both of the racks 133 and 145, a limit switch 230 is engaged by the projecting lug 231 on the control rod 147 for moving this compound gear so as to render the selector switch 232 inoperative to selecting roughing operation or finishing operation for the respective roughing and finishing cutting tools. A similar limit switch 233 is arranged to be operated while the limit switch 230 is rendered inoperative by disengagement of the compound gear 135 with its gear 134 from the rack 133 when the rod 147 is pulled outwardly so its surface 234 engages the limit switch 233 whereupon the tool setting selector switch 232 is rendered operative.

It is to be noted that this apparatus may also be operated so that just the roughing tool actuation may be undertaken or just the finishing tool actuation may be undertaken. This is accomplished by turning the selector switch 193 to the manual position 235 and turning the selector switch 232 to either "tool setting rough" side for actuating the roughing tools or to "tool setting finish" for actuating the finishing tool setup. When placed on the roughing tool side and the tools "in" button 192 pressed, with the compound gear 135 with its gear 134 disengaged from the rack 133, the roughing tools may be fed to and from the work by pressing the tools "in" button or to return these tools by pressing the tools "out" button 236. In a similar manner by positioning the selector switch 232 in the finish position the tools "in" and tools "out" button 192 and 236 may be rendered available for reciprocating the finishing tool feeding cradle 46 by operation of the cylinder 175 in the mechanism described by pressing the tools "in" or tools "out" buttons. In positioning either in the rough or finish position the respective tools "in" and tools "out" buttons are respectively connected to the respective solenoids of the valves 187 and 188 to effect tools "in" and tools "out" operation by hydraulic pressure as described when these respective solenoids 195, 215 and 218 and 225 are respectively energized through suitable electrical control means.

In conjunction with this feeding apparatus of the roughing tools, vibration damping mechanism is also provided for keeping vibration out of the upper roughing tool bars in the manner outlined in patent application Serial 271,304, filed May 2, 1939, now Patent No. 2,191,935 issued February 27, 1940, cited above, which comprises applying fluid pressure from the line 186 through suitable pressure reducing valves 237 and the line 238 to passageways 239, Figs. V and VII, provided in the center drive units 6 and 7 which connect to cylinder chambers 240 in these units in which are slidably mounted suitable plungers 241 which bear against the abutment blocks 242 and 93 fixed to the rear portion of the bars 41, 40 and 39 by suitable screws 243 to serve to push these upper bars outwardly to prevent their jumping into the work due to the sliding downward movement of these bars. When the forward feeding movement is being undertaken high pressure is applied to this line 238 to normally hold these bars backward with their racks against the various pinions 60, 61 and 62 on the shaft 49 to prevent any chatter or slack between these racks and pinions during the cutting operation of the tools of the roughing bars on the work. During the return of these roughing bars from the work the exhausted fluid from these chambers 240 passes back through the line 238 and is bypassed through the valves 237 into the drain line 203 by suitable check valve mechanism 244.

Referring to Fig. XVI, it is to be understood that the lathe is also provided with the usual "stop" button 245 for instantly arresting rotation of the spindle and feeding mechanism of the lathe at any time and the usual "jog" button for intermittently rotating the work spindle to facilitate positioning it for loading or unloading or for setting of the tools in the lathe.

Having thus fully set forth and described our invention what we claim as new and desire to secure by United States Letters Patent is:

1. In a lathe, a pair of oppositely reciprocatable tool feeding devices, a rack fixed on one of said devices, a rack movably mounted on the other of said devices, a common pinion operatively engaging both of said racks, a second pair of operatively reciprocatable tool feeding devices, racks on each of said second mentioned tool feeding devices movably mounted thereon, a common pinion operatively engaging both of said movable racks, a shaft carrying both of said pinions, and means for rotating said shaft to effect relative movement of said movable racks on their respective tool feeding devices while effecting feeding motion in all of said tool feeding devices.

2. In a lathe, a plurality of tool carrier units, a pair of oppositely reciprocatable tool feeding devices in each of said units, racks, some fixed and some adjustably mounted, on said tool feeding devices, pinions associated with each tool carrier unit operatively engaging said racks on said tool feeding devices, a shaft carrying said pinion, and means for rotating said shaft to effect relative movement of said movable racks on said tool feeding devices while effecting feeding motion in said tool feeding devices.

3. In a lathe, a plurality of tool carrier units, pairs of oppositely reciprocatable tool feeding devices in each of said units, racks fixed on said tool feeding devices, in one of said units, a rack fixed on one of the tool feeding devices and movably mounted on the other of said tool feeding devices, in another of said units, racks movably mounted on both of said tool feeding devices in still another of said units, common pinions operatively engaging said racks, a shaft carrying said pinions, and means for rotating said shaft to effect feeding motion in said tool feeding devices.

4. In a lathe, a plurality of tool carrier units, oppositely reciprocatable tool feeding devices in each of said units, a rack on each of said tool feeding devices, a pinion associated with each tool carrier unit adapted to engage the racks on the tool feeding devices in said units, means for independently rotating said pinions at relative different rates of speed to effect feeding motion in said tool feeding devices.

5. In a lathe, a frame, pairs of oppositely reciprocatable tool bars mounted in said frame, a rack on each of said tool bars, co-axially mounted pinions engaging said racks, means for rotating said pinions at different relative rates of rotation to effect different rates of movements for each of said pairs of tool bars in said frames.

6. In a lathe, a frame, pairs of oppositely reciprocatable tool bars in said frame, rack and pinion means for actuating said tool feeding devices, and vibration damping means associated with said tool feeding devices comprising fluid pressure actuated plungers mounted in said frames adapted to engage said tool feeding devices in opposed relation to the direction of feeding of said devices relative to a work piece in said lathe.

7. In a lathe, a frame, pairs of oppositely reciprocatable tool feeding devices mounted in said frame, racks mounted on said tool feeding devices, pinions arranged to engage said racks, a shaft carrying said pinions, means for rotating said shafts to a definite position for effecting a feeding operation of said tool feeding devices relative to a work piece in said lathe, and resilient means for arresting movement of said tool feeding devices when moved to returned position from said work.

8. In a lathe, a pair of oppositely reciprocatable tool feeding devices, racks mounted on each of said tool feeding devices, means permitting relative movement of at least one of said racks relative to its tool feeding device in the direction of relative feeding of said devices, means for accurately limiting said relative movement of said racks, on said tool feeding devices, common pinion means for actuating said racks, and means for rotating said pinion to effect a feeding action of said tool feeding devices in said lathe.

9. In a lathe, a frame, a plurality of pairs of oppositely reciprocatable tool feeding devices arranged in said frame, racks mounted on each tool feeding device of said pairs, pinions associated with each of said pairs engaging said racks, fluid pressure means for rotating said pinions to effect feeding motion of some of said tool feeding devices, cam means actuated by said fluid pressure means for rotating other of said pinions to effect a variable rate of feeding of other of said tool feeding devices independent of the first mentioned tool feeding devices, and means for arresting movement of said fluid pressure actuating means for accurately limiting movement of said tool feeding devices relative to a work piece in said lathe.

10. In a lathe, pairs of oppositely reciprocatable tool feeding devices spaced along the axis of work rotation of said lathe, racks on each of said tool feeding devices, common pinions engaging the racks of each pair of said tool feeding devices, a shaft journaled in the frame of said lathe carrying some of said pinions, means for rotating said shaft comprising a fluid pressure cylinder, a rack reciprocatable by said cylinder, and a gear engaged by said rack and carried by said shaft, means for actuating other of said pinions comprising a sleeve rotatably mounted on said shaft for actuating at least one of these pinions, said sleeve being rotated by means of a rack bar slidably mounted on the frame of said lathe engaging a gear formed on said sleeve, a camplate carrying a cam for actuating rollers on said rack bar, and means interconnecting said camplate with said fluid pressure means for rotating said pinion shaft.

11. In a center drive crankshaft lathe, means for rotatively supporting the end portions of a crankshaft to be turned, center drive chucking mechanism intermediate said end supporting means for supporting and rotating said crankshaft, oppositely reciprocatable tool feeding devices in said lathe each side of said chucking mechanism for feeding cutting tools relative to the bearing portions of said crankshaft, means for actuating said tool feeding devices comprising rack and pinion mechanism in the frame of said lathe associated with said tool feeding devices in which certain of said tool feeding devices may be actuated in delayed movement, while other of said tool feeding devices are actuated in continuous movement, and while still other of said tool feeding devices are operating at variable rates of speed.

12. A hydraulic actuating device comprising a cylinder fixed to the frame of a machine tool, a piston reciprocatably mounted in said cylinder, a piston rod connected to said piston and projecting outwardly from said cylinder, a second piston fixed to the outer end of said piston rod, said second piston being reciprocatably mounted in a cylinder head connected to a member to be actuated, the effective area of said first mentioned piston being greater than the effective area of said second mentioned piston, interconnecting passageways between the head end chambers of said cylinder and said cylinder block whereby fluid pressure may be equally distributed in said chambers, and means for positively arresting movement of said cylinder block against actuation effected by movement of said first mentioned piston in said cylinder whereby continuous movement may be permitted in said first mentioned piston in said cylinder while fluid pressure is discharged from the head end chamber of said cylinder block into the head-end chamber of said cylinder when said cylinder block is arrested against movement.

13. In a lathe, a series of roughing tools, a series of finishing tools, feeding mechanism for each of said group of tools comprising a fluid pressure cylinder, and rack and pinion mechanism interconnecting said cylinder with said roughing tools and rack and pinion actuated cam mechanism for actuating said finishing tools, and fluid pressure means permitting limited continuous relative travel of said finishing tools relative to said roughing tools.

14. In a lathe, a series of roughing tools and a series of finishing tool feeding devices, hydraulic fluid pressure means for actuating said roughing tool feeding devices, a second hydraulic fluid pressure motive means for actuating said finishing tool feeding devices, mechanical interconnecting means between said roughing tool feeding devices and said finishing tool feeding devices and means for rendering said fluid pressure motive means for said finishing tool feeding devices inoperative when said roughing and finishing tool feeding devices are mechanically inter-connected.

15. In a lathe, a series of roughing tool feeding devices, a fluid pressure cylinder for actuating said tool feeding devices, a piston rod projecting from said cylinder, a piston mounted on the projecting end of said rod and operating in a cylinder head carried by said roughing tool feeding devices, means for maintaining fluid pressure in said cylinder head behind said second mentioned piston in excess of the pressure required to actuate said roughing tool feeding devices in cutting action, abutment means for accurately stopping movement of said cylinder head for accurately positioning the roughing tools at the end of their cutting operation, mechanical inter-connecting means between said cylinder rod and said finishing tool feeding devices, and inter-connecting passageways between the chamber in said cylinder head and the chamber in said feeding cylinder for permitting flow of fluid between said chambers whereby said piston rod may continue in feeding movement after said roughing tool feeding devices have been arrested against feeding motion.

16. In a lathe, a series of roughing tool feeding devices, a series of finishing tool feeding devices, a fluid pressure actuating device connected to said roughing tool feeding devices, a fluid pressure actuating device connected to said finishing tool feeding devices, mechanical interconnecting means between said fluid pressure actuating devices, and means for connecting or disconnecting said mechanical inter-connecting means with respect to said devices at a point when both of said tool feeding devices are fully retracted from a work piece in said lathe.

17. In a lathe, a pair of oppositely reciprocatable tool feeding devices, rack and pinion mechanism for effecting feeding movement in said tool feeding devices, a fluid pressure cylinder for actuating said rack and pinion mechanism, a tool feeding device operable for swinging cutting tools in feeding movement, cam means for actuating said swinging tool feeding device, rack and pinion mechanism for actuating said cam means, a fluid pressure cylinder for actuating said rack and pinion for said cam means, fluid pressure control means for rendering one or the other of said fluid pressure cylinders operative, mechanical interconnecting means between the rack and pinion mechanism for said opositely reciprocatable tool bars and the rack and pinion mechanism for said swinging tool feeding device, and means for rendering the hydraulic fluid pressure cylinder for said swinging tool feeding device inoperative when said mechanical inter-connecting device is rendered effective.

18. In a lathe, a series of roughing tool feeding devices and a series of finishing tool feeding devices, fluid pressure means for actuating said tool feeding devices, mechanical inter-connecting means between said fluid pressure feeding device and said finishing tool feeding devices, and fluid pressure means between said roughing tool feeding devices and said fluid pressure feeding device permitting continued relative overtravel of said tool feeding means when said roughing tool feeding devices have reached their fully fed in position.

19. In a lathe, a series of roughing tool feeding devices, a hydraulic cylinder for effecting movement in said tool feeding devices, an overtravel fluid pressure cylinder, associated with said feeding cylinder connecting said feeding cylinder to said roughing tool feeding devices, permitting continued relative travel of said feeding cylinder after said roughing tools have been brought to a positive stopped position, direct mechanical connecting means between said feeding cylinder and a series of finishing tool feeding devices associated with said roughing tools, fluid pressure means for actuating said feeding cylinder whereby said roughing tool feeding devices and said finishing tool feeding devices are initially simultaneously operated until said roughing tool feeding devices are brought to said positive stopped position, said overtravel mechanism then becoming operative to permit continued relative movement of said finishing tool feeding devices to complete the machining operation on a work piece in said lathe.

20. In a lathe, a series of roughing tool feeding devices, fluid pressure motive means for said roughing tool feeding devices, a series of finishing tool feeding devices, fluid pressure motive means for said finishing tool feeding devices, a source of fluid pressure, a control valve interconnecting said source of fluid pressure with said fluid pressure motive means for the roughing tool feeding devices, a control valve inter-connecting said source of fluid pressure with said fluid pressure motive means for the finishing tool feeding devices, mechanical inter-connecting means for connecting or disconnecting both of said fluid pressure feeding motive means and means for rendering the control valve for the fluid pressure motive means for the finishing tools inoperative when both of said fluid pressure motive means are mechanically inter-connected.

21. In a lathe, a tool feeding device movable relative to a work piece in said lathe; fluid pressure motive means for effecting movement in said tool feeding device, fluid pressure control means associated with said motive means comprising a control valve for varying the rates of relative feed of said tool feeding device, actuating mechanism connected to said motive means for automatically actuating said control valve to effect a predetermined sequence of feed rates in said motive means, and manual control means associated with said feed rate control valve whereby certain of the rates of feed, automatically affected by said feed rate control valve, may be effected manually independent of the automatic operation of said control valve.

22. In a lathe, a tool feeding device, a fluid pressure cylinder for actuating said tool feeding device, a source of fluid pressure for actuating said cylinder, a control valve for selectively applying fluid pressure for actuating said cylinder in either direction, a feed rate control valve for varying the rate of feeding of said cylinder in rapid traverse, coarse feed, and fine feed, a control dog movable with said piston of said feeding cylinder effective to control said control valve to effect said rapid traverse, coarse feed, and fine feed automatically in predetermined sequence, a second manually operated control valve associated with said automatic control valve whereby the rapid traverse movement of said hydraulic cylinder may be prolonged beyond the point of automatic change from rapid traversing movement to coarse feed movement, and means for automatically rendering said manual rapid traverse control valve inoperative by the movement of said feeding device to a predetermined inward position further advanced than the normal automatic position of change from rapid traverse to coarse feed.

23. In a lathe, a series of roughing tool feeding devices, a series of finishing tool feeding devices, a fluid pressure actuating cylinder for each of said tool feeding devices, a source of fluid pressure for actuating said cylinder, a feed direction control valve connected to said source of fluid pressure for each of said fluid pressure feeding cylinders, a feed rate control valve associated with each of said cylinders effective on the in-feeding stroke to control the rapid traverse, coarse feed, and fine feed actuation of each of said cylinders, hydraulic-electrical control apparatus, for rendering fluid pressure for actuating said fluid pressure feeding device for the roughing tools, effective when the fluid pressure actuating cylinder for the finishing tools is inoperative, means actuated by the roughing tool feeding devices when reaching their return position for rendering the roughing tool feeding cylinder inoperative while rendering said finishing tool feeding cylinder operative, and means operated by the return movement of said finishing tool feeding devices for rendering both of said feeding cylinders inoperative and for arresting rotation of the work spindle of said lathe.

WILLIAM F. GROENE.
HAROLD J. SIEKMANN.